US012744659B2

(12) United States Patent
Reddy et al.

(10) Patent No.: US 12,744,659 B2

(45) Date of Patent: Sep. 22, 2026

(54) ADVANCED SECURITY THROUGH ANOMALY DETECTION AND LOCATING IN WIRELESS NETWORKS

(71) Applicant: Cisco Technology, Inc., San Jose, CA (US)

(72) Inventors: Vijay S Reddy, Foster City, CA (US); Peiman Amini, Fremont, CA (US); Ardalan Alizadeh, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 47 days.

(21) Appl. No.: 19/034,385

(22) Filed: Jan. 22, 2025

(65) Prior Publication Data

US 2026/0213920 A1 Jul. 23, 2026

(51) Int. Cl.
*H04L 9/06* (2006.01)
*H04W 12/104* (2021.01)

(52) U.S. Cl.
CPC ......... *H04L 9/0643* (2013.01); *H04W 12/104* (2021.01)

(58) Field of Classification Search
CPC ......... H04L 9/0643; H04L 9/32; H04L 63/16; H04W 12/104; H04W 12/06; H04W 24/10; H04W 4/02; G06F 7/04; G01S 5/14
USPC .......................................................... 380/28
See application file for complete search history.

(56) References Cited

U.S. PATENT DOCUMENTS

| | | | | |
|---|---|---|---|---|
| 8,559,996 | B2 * | 10/2013 | Lehr | H04L 12/44 700/286 |
| 8,707,432 | B1 | 4/2014 | Rathi et al. | |
| 9,594,948 | B2 * | 3/2017 | Gouda | A45D 44/005 |
| 9,866,578 | B2 * | 1/2018 | Moore | H04L 63/1416 |
| 10,020,436 | B1 * | 7/2018 | Gravina | H05K 7/1492 |
| 12,141,675 | B1 | 11/2024 | Duong | |
| 12,531,642 | B1 * | 1/2026 | Peng | H04B 17/309 |
| 2008/0028224 | A1 * | 1/2008 | Pitsos | H04L 9/3236 713/176 |
| 2012/0110635 | A1 | 5/2012 | Harvey et al. | |

(Continued)

FOREIGN PATENT DOCUMENTS

WO 03100559 A2 12/2003

*Primary Examiner* — Sargon N Nano

(74) *Attorney, Agent, or Firm* — Lee & Hayes, P.C.

(57) ABSTRACT

In one embodiment, a method includes collecting, by a device and from each of one or more access points over time within a monitored location, a plurality of hash values, each of the plurality of hash values based on a combination of a plurality of location-related metrics for a respective access point of the one or more access points and calculating, by the device, a baseline hash value for each access point of the one or more access points, each baseline hash value correlated to actual location-related metrics from which each baseline hash value was computed. The method further includes detecting, by the device, an anomalous change in a particular collected hash value of the plurality of hash values from at least one access point of the one or more access points, obtaining, by the device and in response to the anomalous change, a plurality of non-hashed location-related metrics from the at least one access point, and performing, by the device, a security analysis action based on the plurality of non-hashed location-related metrics.

20 Claims, 8 Drawing Sheets

(56) References Cited

U.S. PATENT DOCUMENTS

| | | | | |
|---|---|---|---|---|
| 2013/0249910 | A1* | 9/2013 | Matsumiya | G06T 15/503 345/420 |
| 2016/0269913 | A1 | 9/2016 | Paulraj et al. | |
| 2021/0312777 | A1* | 10/2021 | Ghourchian | G08B 13/2491 |
| 2026/0101211 | A1* | 4/2026 | Struhl | H04W 24/08 |

* cited by examiner

ADVANCED SECURITY THROUGH ANOMALY DETECTION AND LOCATING IN WIRELESS NETWORKS

TECHNICAL FIELD

The present disclosure relates generally to computer networks, and, more particularly, to advanced security through anomaly detection and locating in wireless networks.

BACKGROUND

In modern network environments, especially those with extensive wireless infrastructure, detecting anomalies is critical to safeguarding against a variety of security threats. These threats can include unauthorized access, network intrusions, signal interference, tampering, and other malicious activities.

In order to alleviate the concerns associated with security threats in AP deployments, some approaches seek to identify "rogue" APs. Detection of "rogue" APs can be done based on numerous factors such as device fingerprinting, client device behavior monitoring, and so on. In such approaches, locating such rogue APs can be difficult, if even possible, and often resorts to inefficient and manually intensive investigation by human troubleshooters, such as by walking around a space with listening devices and/or watching signal strength, generally attempting to triangulate a rogue AP based on radio frequency (RF) signals or other similar techniques.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4-1 and 4-2 illustrate an example of a system for advanced security through anomaly detection and locating in wireless networks in accordance with the disclosure.

DESCRIPTION OF EXAMPLE EMBODIMENTS

Overview

According to one or more embodiments of the disclosure, a method for advanced security through anomaly detection and locating in wireless networks includes collecting, by a device and from each of one or more access points over time within a monitored location, a plurality of hash values, each of the plurality of hash values based on a combination of a plurality of location-related metrics for a respective access point of the one or more access points and calculating, by the device, a baseline hash value for each access point of the one or more access points, each baseline hash value correlated to actual location-related metrics from which each baseline hash value was computed. The method further includes detecting, by the device, an anomalous change in a particular collected hash value of the plurality of hash values from at least one access point of the one or more access points, obtaining, by the device and in response to the anomalous change, a plurality of non-hashed location-related metrics from the at least one access point, and performing, by the device, a security analysis action based on the plurality of non-hashed location-related metrics.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
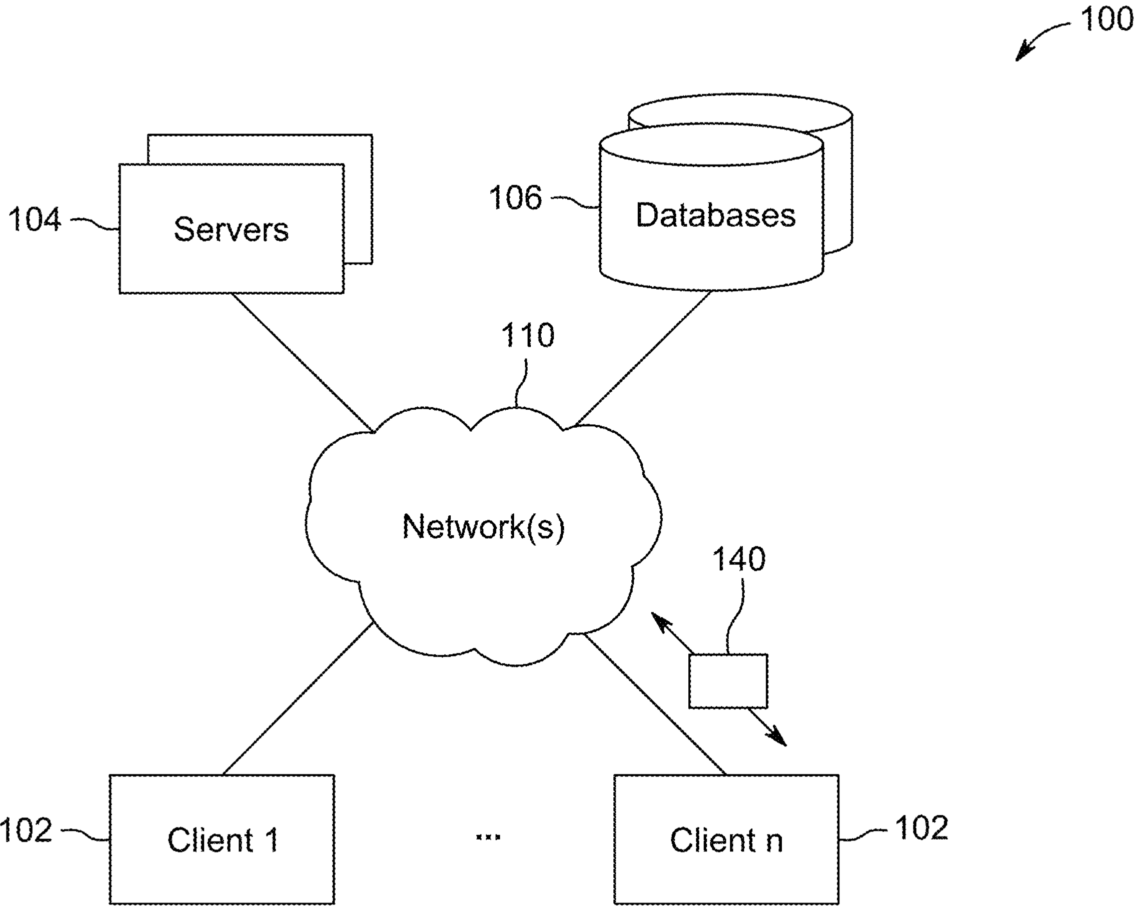
FIG. 1 illustrates an example computing system.

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user'data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
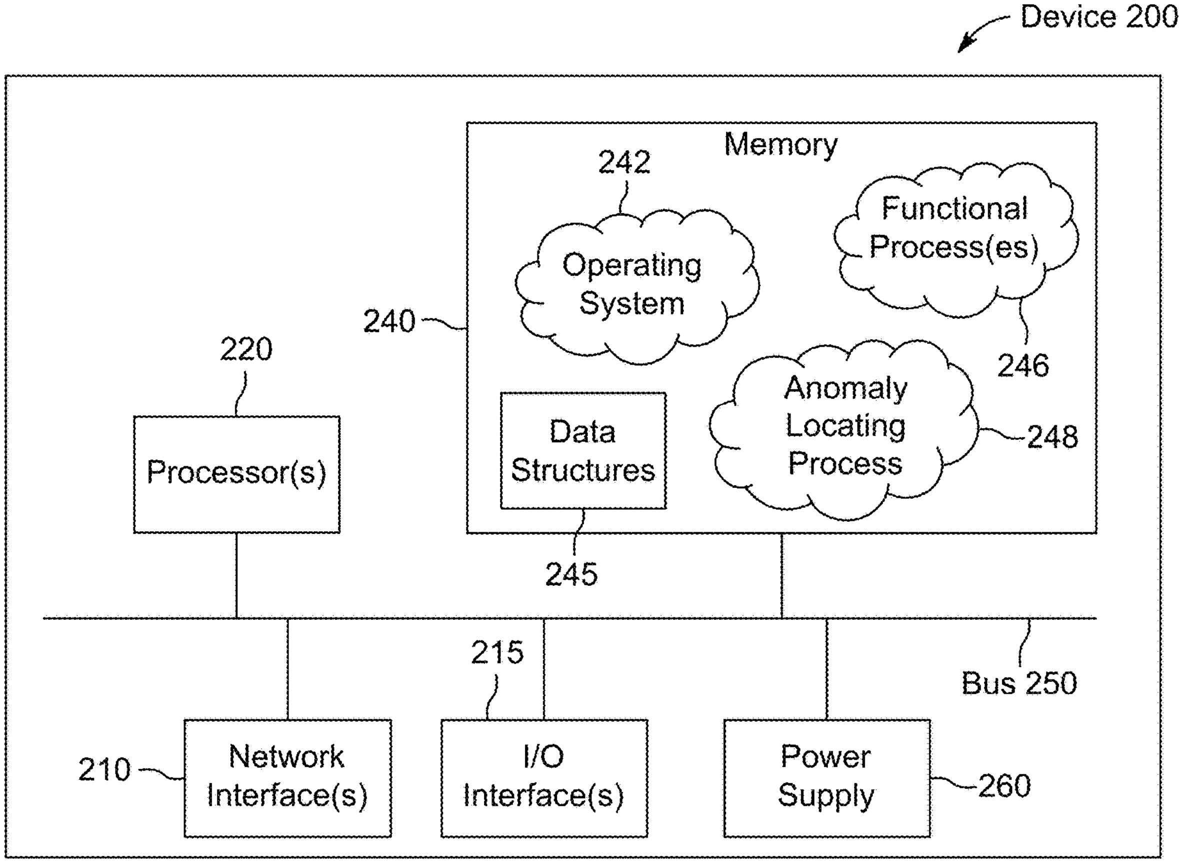
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, an anomaly locating process (process 248), as described herein, each of which may alternatively be located within individual network interfaces.

Notably, one or more functional processes 246, when executed by processor(s) 220, cause each device 200 to perform the various functions corresponding to the particular device'purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, one or more functional processes 246 and/or anomaly locating process (process 248) may include computer executable instructions that, when executed by processor(s) 220, cause device 200 to perform the techniques described herein. To do so, in some implementations, one or more functional processes 246 and/or process 248 may utilize machine learning. In various implementations, one or more functional processes 246 and/or process 248 may employ one or more supervised, unsupervised, or semi-supervised machine learning models.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

—Advanced Security Through Anomaly Detection and Locating in Wireless Networks—

As noted above in modern network environments, especially those with extensive wireless infrastructure, detecting anomalies is critical to safeguarding against a variety of security threats. These threats can include unauthorized access, network intrusions, signal interference, tampering, and other malicious activities.

As also noted above, to alleviate the concerns associated with security threats in AP deployments, some approaches seek to identify "rogue" APs. Detection of "rogue" APs can be done based on numerous factors such as device fingerprinting, client device behavior monitoring, and so on. In such approaches, locating such rogue APs can be difficult, if even possible, and often resorts to inefficient and manually intensive investigation by human troubleshooters, such as by walking around a space with listening devices and/or watching signal strength, generally attempting to triangulate a rogue AP based on radio frequency (RF) signals or other similar techniques.

The techniques herein therefore provide for enhanced network security by detecting anomalies using a combination of multiple data inputs, ensuring robust protection against potential threats. In particular, an advanced anomaly detection system provided as part of an anomaly locating process, such as AnyLocate® by Cisco Systems, Inc.®, that leverages diverse network parameters, such as geolocation, roaming patterns, modulation and coding scheme (MCS) value variations, beamforming changes, and/or identity-based access patterns. By integrating a hash-based mechanism, the system ensures efficient and sensitive detection of security threats, offering a comprehensive approach to maintaining network integrity.

In contrast to approaches that rely solely on the calculated positions provided by GNSS receivers, and as opposed to utilizing GNSS raw data directly, the present disclosure allows not only for location-based anomaly detection, but furthermore allows for assisting in locating the anomaly using advanced geo-locating techniques from mixed metrics. Furthermore, due to the increased size in such data, implementations herein utilize a hash-based anomaly indicator, which can trigger the pull of more specific metrics to allow for fine-tuned assessment and locating.

Anomaly detection in wireless networks, including monitoring geolocation, roaming patterns, MCS, beamforming patterns, and integrating identity-based security measures, is a useful paradigm in the field of network security. Traditional systems often analyze these parameters individually or use machine learning models to detect anomalies based on predefined thresholds or patterns. In contrast to these simplistic techniques, aspects of the disclosure introduce a hash-based anomaly detection framework that fuses multiple network parameters into a single hash value using feature hashing techniques. This multi-input data fusion allows for a more comprehensive and efficient detection of anomalies by capturing the interdependencies between various network parameters as compared to some approaches.

Further, aspects of the present disclosure implement adaptive hash functions that evolve based on historical data, enhancing sensitivity to meaningful changes while reducing false positives. This dynamic adaptation is not utilized in some approaches, where static thresholds or models are typically used. Additionally, the ability to pinpoint the exact location of suspicious clients relative to access points (APs) and to automatically quarantine these devices adds a layer of proactive response that goes beyond mere detection. The combination of these features—multi-parameter hash-based detection, adaptive hashing, precise client localization, and automatic quarantine—provides a novel approach that is distinct from existing technologies in network anomaly detection. Moreover, the anomaly detection techniques described herein involve monitoring and analyzing multiple network parameters to identify abnormal behaviors or conditions that deviate from established baselines, potentially indicating security breaches or unauthorized activities.

Specifically, according to one or more embodiments of the disclosure as described in detail below, a method for advanced security through anomaly detection and locating in wireless networks includes collecting, by a device and from each of one or more access points over time within a monitored location, a plurality of hash values, each of the plurality of hash values based on a combination of a plurality of location-related metrics for a respective access point of the one or more access points and calculating, by the device, a baseline hash value for each access point of the one or more access points, each baseline hash value correlated to actual location-related metrics from which each baseline hash value was computed. The method further includes detecting, by the device, an anomalous change in a particular collected hash value of the plurality of hash values from at least one access point of the one or more access points, obtaining, by the device and in response to the anomalous change, a plurality of non-hashed location-related metrics from the at least one access point, and performing, by the device, a security analysis action based on the plurality of non-hashed location-related metrics.

Figure 3A:
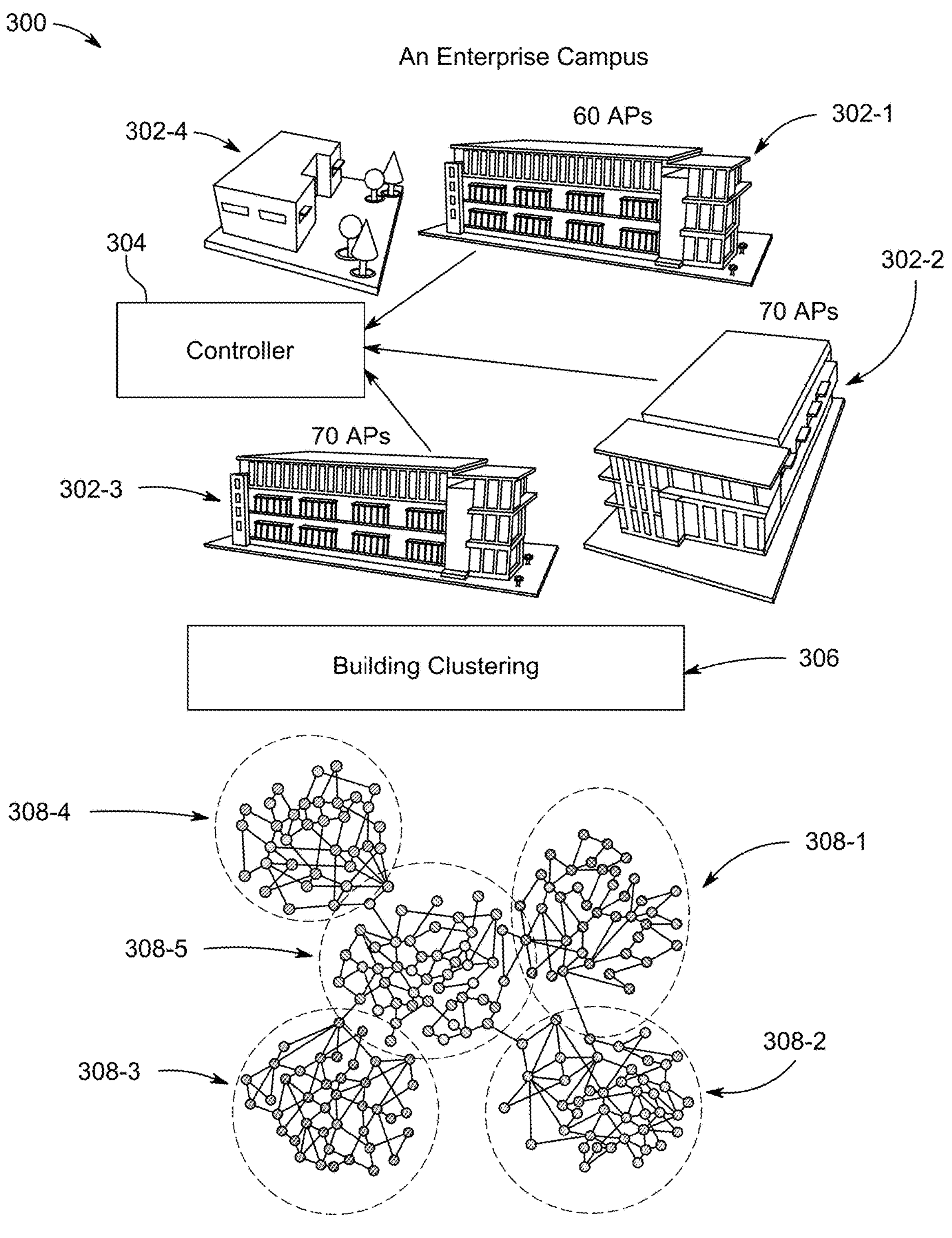
FIGS. 3A-3C illustrate examples of locating access points in campus settings, building settings, and floor settings.
Figure 3B:
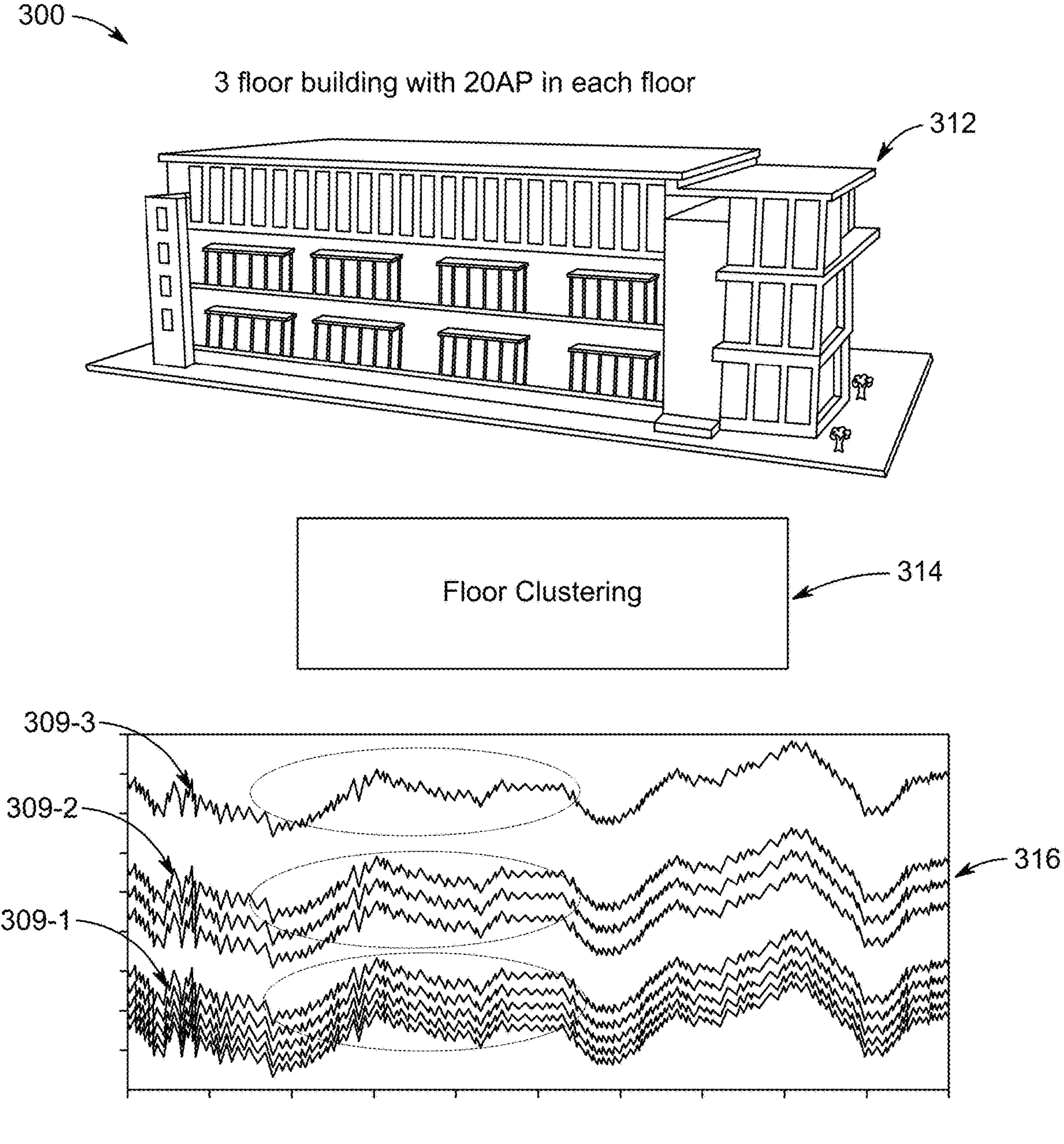
Figure 3C:
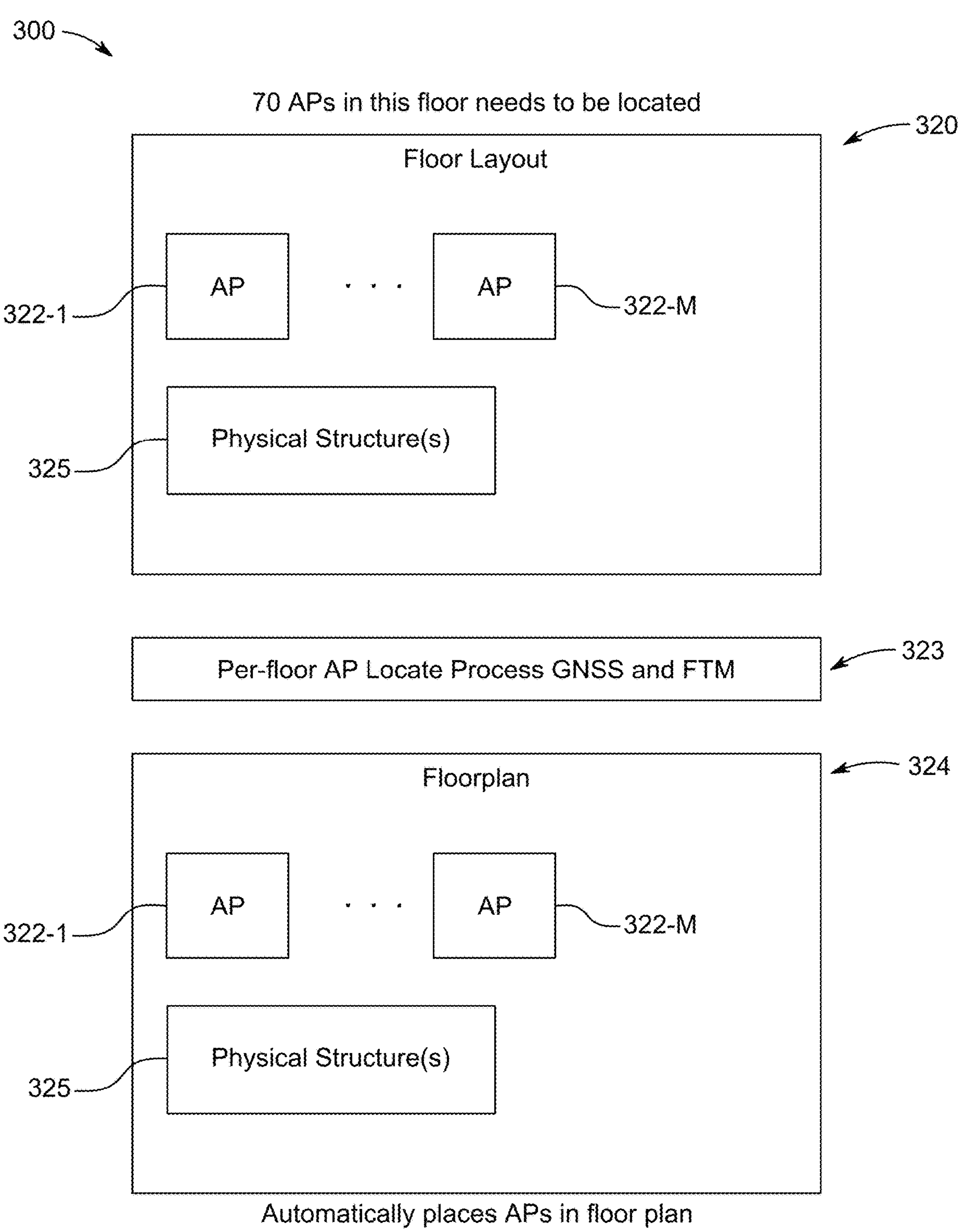

Operationally, FIGS. 3A-3C illustrate examples of locating access points in campus settings, building settings, and floor settings, though outdoor situations may also benefit from the techniques herein. In particular, FIG. 3A illustrates an example of locating access points in campus settings, FIG. 3B illustrates an example of locating access points in building settings, and FIG. 3C illustrates an example of locating access points in building settings floor settings.

As shown in FIG. 3A, a system 300 (e.g., an enterprise campus network) includes four buildings (e.g., a first building 302-1, a second building 302-2, a third building 302-3, and a fourth building 302-4). It will be appreciated that implementations herein are not limited to a particular quantity or number of buildings and implementations herein contemplate enterprise campus networks that include greater than four buildings or fewer than four buildings. A controller 304 (or one or more controllers) can be deployed in the system 300 and may be coupled to network devices (e.g., routers, APs, network switches, etc.). In some implementations, the controller 304 can be an SDN controller, although implementations are not so limited.

Using building clustering 306 techniques, a cluster map can be generated showing the communication between the various network devices. In the example of FIG. 3A, this cluster map may include a first cluster 308-1 (which can be associated with the first building 302-1), a second cluster 308-2 (which can be associated with the second building 302-2), a third cluster 308-3 (which can be associated with the third building 302-3), a fourth cluster 308-4 (which can be associated with the fourth building 302-4), and a fifth cluster 308-5 (which can be associated with the outdoor space between the buildings).

As shown in FIG. 3B, a system 300 (e.g., an enterprise network) includes a building 312, such as any of the buildings in FIG. 3A above. The building in FIG. 3B can have floors (e.g., stories), although it will be appreciated that implementations herein are not limited to a particular quantity or number of floors and implementations herein contemplate enterprise networks that include greater than three floors or fewer than three floors. Although not explicitly shown in FIG. 3B, a controller, such as the controller 304 (or one or more controllers) can be deployed in the system 300 and may be coupled to network devices (e.g., routers, APs, network switches, etc.). Notably, the controller may also be remotely located, such as a cloud-based controller configuration, or other similar system design.

Using floor clustering 314 techniques, a cluster map can be generated showing the communication between the various network devices. In the example of FIG. 3B, this cluster map 316 may include a first cluster 309-1 (which can be associated with the first floor of the building 312), a second cluster 309-2 (which can be associated with the second floor of the building 312), and a third cluster 309-3 (which can be associated with third floor of the building 312).

As shown in FIG. 3C, a system 300 (e.g., an enterprise network) includes a floor layout 320 that can include a plurality of APs (e.g., a first AP 322-1 through an $M^{th}$ AP 322-M), such as a particular floor of the building shown in FIG. 3B above. The floor layout 320 can further include physical structure(s) 325. As an example, the floor layout 320 can represent a floor of an office building showing locations of multiple APs on that particular floor. The physical structure(s) 325 can include walls, room dividers, desks, water coolers, support pillars, and so on and so forth that may be present on the floor of an office building.

A per-floor AP locating process using GNSS raw data and ranging FTM (Fine Timing Measurement) data can be employed at block 323 in order to generate a floorplan 324. The floorplan 324 can include the physical structure(s) 325 that are present on the floor of the building in addition to the plurality of APs (e.g., the first AP 322-1 through the $M^{th}$ AP 322-M), however, the relative positioning of the plurality of APs may be different in the floorplan 324 than in the floor layout 320. That is, the relative positioning of the plurality of APs in the floorplan 324 can be determined and/or optimized using the techniques described herein to provide a safer and better provisioned network than a network that relies on the floor layout 320.

In the examples of FIGS. 3A-3C, a location process (e.g., anomaly locating process (process 248), which can be provided by AutoLocate® or other similar process) can be employed to precisely locate APs at the campus, building, and floor level, thereby improving the management of wireless AP networks on a large scale. As shown in FIGS. 3A-3C, such a process can utilize a sophisticated building clustering algorithm to categorize APs into specific buildings within a campus environment. Once the APs are identified within their respective buildings, the system seamlessly transitions to the floor clustering algorithm, meticulously determining the exact floor where the desired APs are located.

In accordance with the disclosure, this process employs a combination of GNSS raw data and ranging FTM (Fine Timing Measurement) data to position the APs with a high level of precision onto the floorplan 324. This integration of cutting-edge positioning technologies not only ensures the accuracy of AP placement but also facilitates seamless integration with existing floor layouts, providing users with a comprehensive visual representation of their network infrastructure. More specific details involving the AP positioning process and explanations of the algorithms and methodologies employed to achieve accuracy and reliability in the network are described herein.

Figures 1, 4:
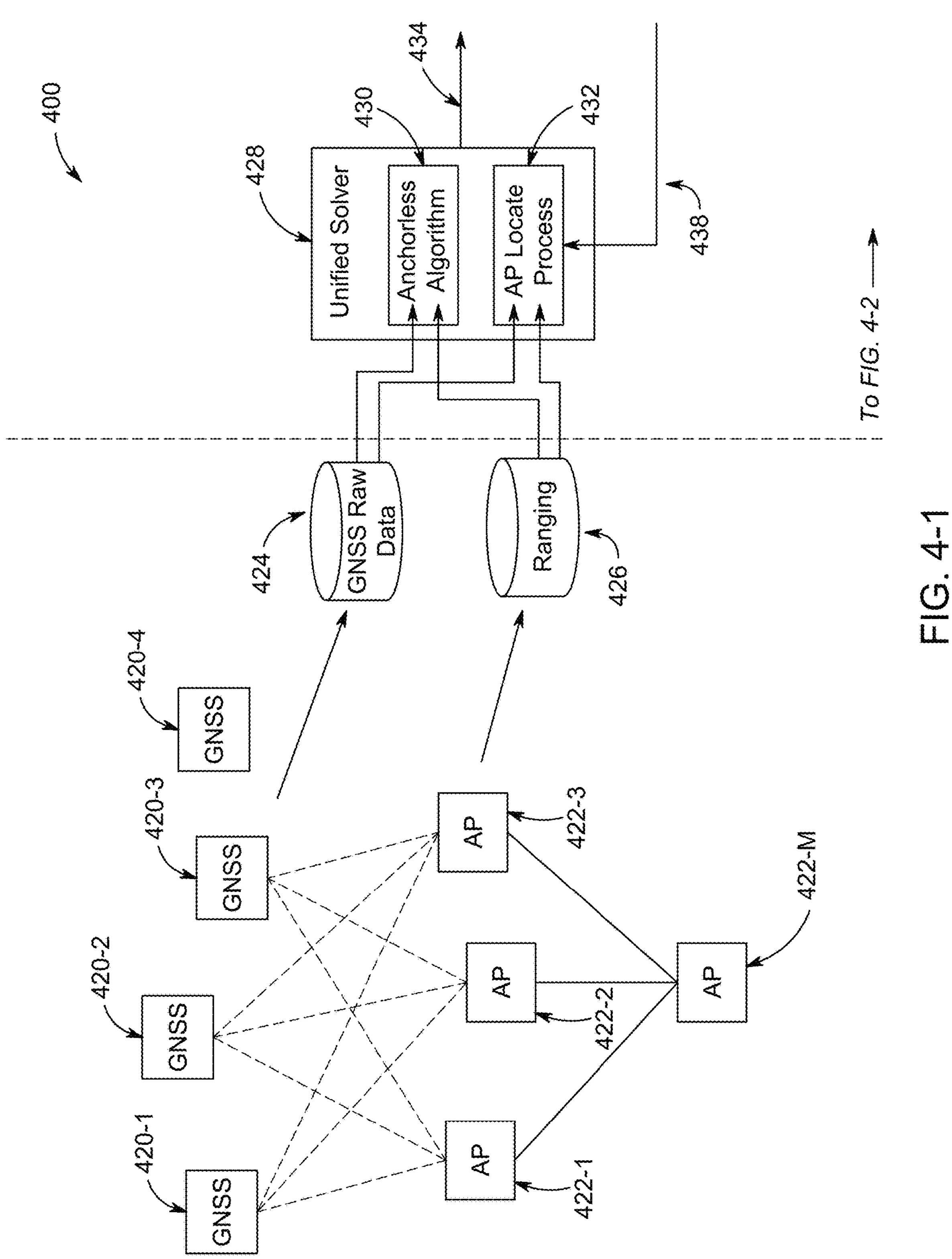
Figures 2, 4:
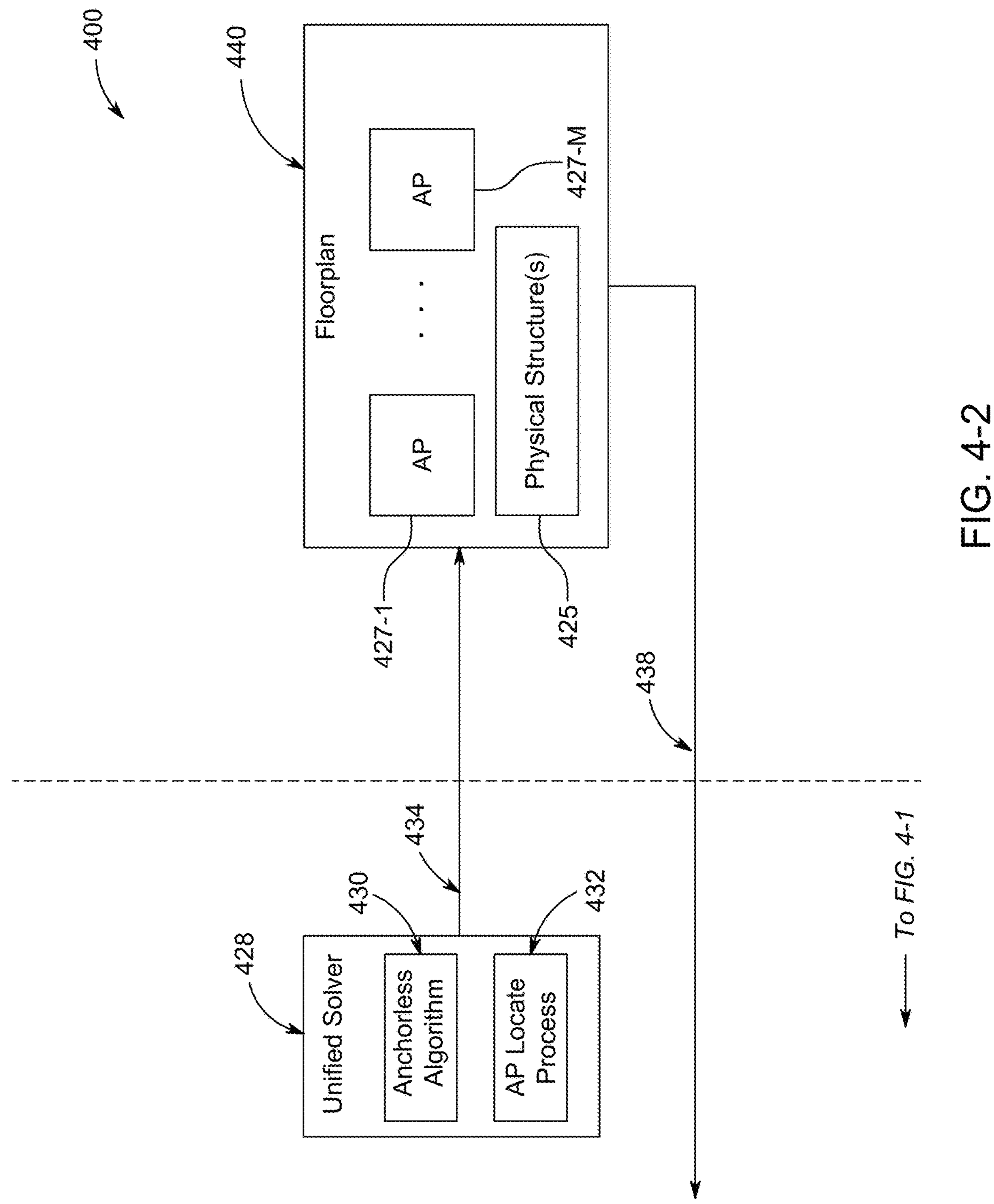

FIGS. 4-1 and 4-2 illustrate an example of a system for advanced security through anomaly detection and locating in wireless networks in accordance with the disclosure. The system 400 shown in FIGS. 4-1 and 4-2 includes a plurality of GNSS satellites (e.g., a first GNSS 420-1, a second GNSS 420-2, a third GNSS 420-3, and a fourth GNSS 420-4) that are communicatively coupled to a plurality of access points (e.g., a first AP 422-1, a second AP 422-2, a third AP 422-3, and a fourth AP 422-4). It will be appreciated that the quantity of GNSS and or APs can be greater than or fewer than four and the example of FIGS. 4-1 and 4-2 is merely illustrative.

As shown in FIG. 4-1, data from the plurality of GNSS satellites (i.e., GNSS raw data 424) can be collected while ranging data 426 (e.g., ranging FTM) can be collected from the plurality of APs. The GNSS raw data 424 and the ranging data 426 can be provided to a unified solver 428. More specifically, GNSS raw data 424 and the ranging data 426 can be provided to an anchorless algorithm 430 and an AP locate process 432, which are deployed within the unified solver 428. The unified solver 428 can process data output from the anchorless algorithm 430 and the AP locate process 432 via output 434 to the floorplan 440 (illustrated in FIG. 4-2).

As shown in FIG. 4-2, the output 434 can be received to generate the floorplan 440, which can include a plurality of APs (e.g., a first AP 422-1 through an $M^{th}$ AP 422-M) and physical structure(s) 425. In some implementations, the first AP 422-1 through the $M^{th}$ AP 422-M) and physical structure(s) 425 can be analogous to the first AP 322-1 through the $M^{th}$ AP 322-M and the physical structure(s) 325 of FIG. 3C. The floorplan 440 can further be configured to return data (e.g., floorplan data, updated AP data, etc.) to the unified solver 428 via path 438.

In this example, the system 400 a location process can use two main sources of data to position the APs:

1) GNSS raw data: GNSS raw data consists of: 1) the time of the measurement, 2) satellite pseudoranges measured between the satellite and GNSS receiver, 3) their standard deviations, 4) carrier phase, and 5) Doppler shifts.
2) Inter-AP distances: Inter-AP distance measurement (i.e., "ranging," or "FTM") uses 802.11mc/az involves leveraging precise time measurements to determine the distance between two points or objects. This technique relies on accurately measuring the time it takes for a signal or wave to travel from a transmitter to a receiver and back again.

In some implementations, the APs are equipped with GNSS receivers. GNSS raw data can then be collected from APs located on the perimeter of buildings to ensure optimal azimuthal coverage or skyview. Using the inter-AP distances (measured by FTM), these APs are used as anchors in the positioning process, facilitating the precise positioning of other APs that lack GNSS receivers or suffer from inadequate satellite coverage.

In scenarios where GNSS reception is unavailable or insufficient, techniques herein (e.g., the process) can automatically transition to utilizing ranging data to calculate the relative positions of APs, ensuring accuracy and reliability in AP localization across diverse environmental conditions. Further, implementations herein provide for a drag-and-drop functionality (e.g., on a graphical user interface), which allows for fine-tuning of the AP constellation directly on the map interface (e.g., the cluster maps of FIGS. 3A-3B).

Notably, conventional methods rely on the calculated positions provided by GNSS receivers, where the positions of APs are calculated using GNSS receivers acting as fixed anchors, and integrating ranging data to those receivers in order to determine the positions of other APs within the network. However, these methodologies are susceptible to error propagation, where the inaccuracies associated with each GNSS receiver's calculated position are compounded, leading to significant inaccuracies in the overall AP positioning. This reliance on calculated positions without GNSS raw data at the AP itself can lead to error accumulation and suboptimal localization.

In contrast, certain implementations described herein may adopt a more advanced methodology that utilizes GNSS raw data alongside the precise location information of satellites as fixed anchors. By integrating this comprehensive dataset with ranging data, implementations described herein determine the positions of APs with much higher accuracy than previous approaches. By leveraging this robust combination of data sources, aspects of the present disclosure mitigate error propagation and significantly improve the overall accuracy and reliability of AP localization.

Various techniques are performed by the components of FIG. 4-1 and FIG. 4-2 to accomplish the techniques disclosed herein. These techniques are described in more detail below:

Geolocation and Roaming Pattern Monitoring:

Monitor real-time geolocation data to track the positions of APs and clients. Detect unauthorized movements or suspicious behavior, such as clients connecting from unexpected locations or APs showing unusual geographic shifts.

Analyze historical and real-time roaming patterns of devices. Detect deviations that could indicate potential intrusions, such as sudden changes in roaming behavior that are inconsistent with typical movement patterns.

MCS and Beamforming Pattern Analysis:

Continuously monitor Modulation and Coding Scheme (MCS) values across the network. Identify unusual drops or spikes in MCS, which may signal potential attacks like jamming or unauthorized high-data-rate transmissions.

Analyze beamforming patterns to detect anomalies. Sudden, unexplained changes in beamforming behavior could indicate tampering, interference, or the presence of unauthorized devices attempting to manipulate network traffic.

Identity-Based Security Integration (ISE):

An Identity Services Engine (ISE) can be used to correlate identity-based access patterns with observed network behavior. This cross-verification ensures that authenticated devices are behaving as expected, enhancing overall network security.

Automatically quarantine devices identified as suspicious based on ISE correlation and anomaly detection. Isolate these devices from the network to prevent potential security breaches.

Hash-Based Anomaly Detection:

Generate hash values from diverse network parameters (e.g., geolocation, MCS, beamforming) using feature hashing techniques. Large differences in hash outputs between current and historical data indicate a higher probability of an anomaly.

Develop adaptive hash functions that evolve based on historical data, ensuring sensitivity to meaningful changes. This adaptation reduces false positives and improves the accuracy of anomaly detection.

Algorithms to score deviations between current and historical hash outputs can be employed. Assign higher anomaly probabilities to larger deviations, prioritizing the investigation of significant changes.

Client Location and Response:

Use the anomaly detection framework to pinpoint the exact location of suspicious clients relative to APs. This spatial information allows for targeted responses, such as investigating specific areas of the facility.

Upon detecting a high-probability anomaly, automatically mark the identified device as quarantined within the network, isolating it and preventing further access until it is investigated and cleared.

Algorithm for Anomaly Detection via Multi-Input Data Fusion Data Collection and Initialization:

- Continuously gather data from geolocation, MCS, beamforming patterns, and ISE. Store this data in a time-series format for real-time and historical analysis.
- Use historical data to establish baselines for each network parameter, including expected geolocation zones, normal MCS ranges, typical beamforming patterns, and standard access behaviors.

Real-Time Monitoring and Analysis:

- Track real-time geolocation data and compare it to historical roaming patterns. Use geofencing to detect if devices are operating outside of their expected zones, triggering anomaly flags.
- Monitor MCS and beamforming data in real-time. Detect and log any unexpected variations and cross-reference these with known network events or scheduled changes to filter out benign fluctuations.

Hash-Based Anomaly Detection:

- Implement a feature hashing mechanism that converts the collected network parameters into hash values. Store these hashes in a distributed database for comparison over time.
- Adaptive Hash Function: Develop and apply adaptive hash functions that are sensitive to meaningful changes. Update these functions periodically based on new data to ensure ongoing relevance.
- Create an algorithm to calculate the deviation between current and historical hash values. Set thresholds for deviations, and trigger alerts when these thresholds are exceeded.

Continuous Learning and Refinement:

- Implement a feedback mechanism where the outcomes of anomaly investigations are fed back into the system. This improves the accuracy of the anomaly detection algorithms over time.
- Periodically update the historical baselines and adaptive hash functions based on the latest network data and identified anomalies, ensuring the system remains effective against evolving threats.

As discussed herein, aspects of the present disclosure can include monitoring geolocation data and changes in roaming patterns to detect unauthorized movements or suspicious behavior within the network. MCS variations can also be tracked to identify unusual network activity or potential intrusions. In addition, changes in beamforming patterns can be monitored to detect anomalies that could indicate tampering or interference. ISE can be used to correlate identity-based access patterns with network behavior, providing a comprehensive security view. Hash values can be generated from network parameters using feature hashing techniques. Larger differences in hash outputs indicate higher anomaly probabilities. Adaptive hash functions can be implemented based on historical data to ensure sensitivity to meaningful changes. Algorithms to score deviations between current and historical hash outputs, with larger differences signaling higher anomaly probabilities are provided. The exact client location relative to the APs can be determined and can be used to point to a place where a suspicious client may be located. Devices may be quarantined based on the determinations made herein.

Aspects of the present disclosure can provide protection against a scenario in which a nefarious entity comes to a campus and installs an AP that is not really legitimate, and tries to provision it as a valid legitimate AP. This scenario can clearly lead to security issues, particularly if the nefarious manages to install such an illegitimate AP that has an agent (or other software) running, sending all the information to device(s) outside of the network.

Accordingly, in at least one implementation, the disclosure can provide detection of such cases that one (or more) AP is not a legitimate AP by determining that one or more factors associated with a particular AP indicate that the particular AP is an illegitimate AP that has been nefariously inserted into the network. In such a scenario, the techniques herein can allow for utilization of changes in information (e.g., the roaming pattern, geolocation information, etc.), to be determined to locate the illegitimate AP and, hence, the nefarious actor. For example, if it is determined using the techniques described herein that something goes wrong with that specific AP, e.g., that the roaming pattern is different, etc., then some physical layer aspect of that AP can be compared to the historical data to identify the anomaly and/or that something different is happening on that particular AP specifically (e.g., beamforming behavior is different, the MCS is different, etc.). That is, while the nefarious actor may be able to hide suspicious activity at some layers, the nefarious actor cannot hide such behavior at the physical layer. In this manner, and by utilizing ISE, the illegitimate AP may be located, quarantined, disabled, etc. in order to facilitate the enhanced security features described herein.

Stated alternatively, aspects of the present disclosure allow for the detection and identification of legitimate APs in a network and/or the validation of whether an identified AP is a legitimate AP, an illegitimate AP, or an AP that may be misbehaving despite being a legitimate AP. As mentioned above, one of the key elements of the techniques herein hinges on the hash-based anomaly detection paradigm presented herein.

That is, instead of relying merely on movement detection associated with an AP (which is pretty straightforward and, in many cases, yields false alarms), as in some current approaches, aspects of the present disclosure combine multiple data inputs (as discussed above in connection with FIGS. 3A-3C and FIG. 4-1 and FIG. 4-2) together as a hash and generate a hash output. As discussed above, the multi-input data can allow for identification of anomalies in the network. In addition, other inputs, such as physical layer roaming aspects and/or device/client location identification can be utilized in accordance with the disclosure. In general, however, by using the hash generator, which can be implemented, for example, by the unified solver 428, it is possible to that something is wrong with the particular AP. Further, reinforcement learning, machine learning, and/or other computer-aided techniques can be used to update the weighting of the inputs that how much each input is impacting the hash generated output.

As mentioned above, at least one stage of the techniques described herein provides advanced security anomaly detection. However, as mentioned above, even this stage can involve a significant amount of data processing that could become overburdensome for the entire system. As discussed above, in order to mitigate this issue, aspects of the disclosure allow for the creation of hash in order to detect changes (e.g., changes that exceed a threshold) in this hash, Based on the threshold change in the has exceeding a threshold value, the disclosure allows for multiple mitigation techniques—from reexamining the easily available data to fully recalculating the raw data inputs discussed in FIG. 4-1 and FIG. 4-2 to ascertain the risk, threat level, etc. to the network based on the information available. These options provide enhanced location, detection, and remediation of nefarious devices in a network and can be analyzed automatically or with the assistance of a network administrator, in accordance with the disclosure.

Figure 5:
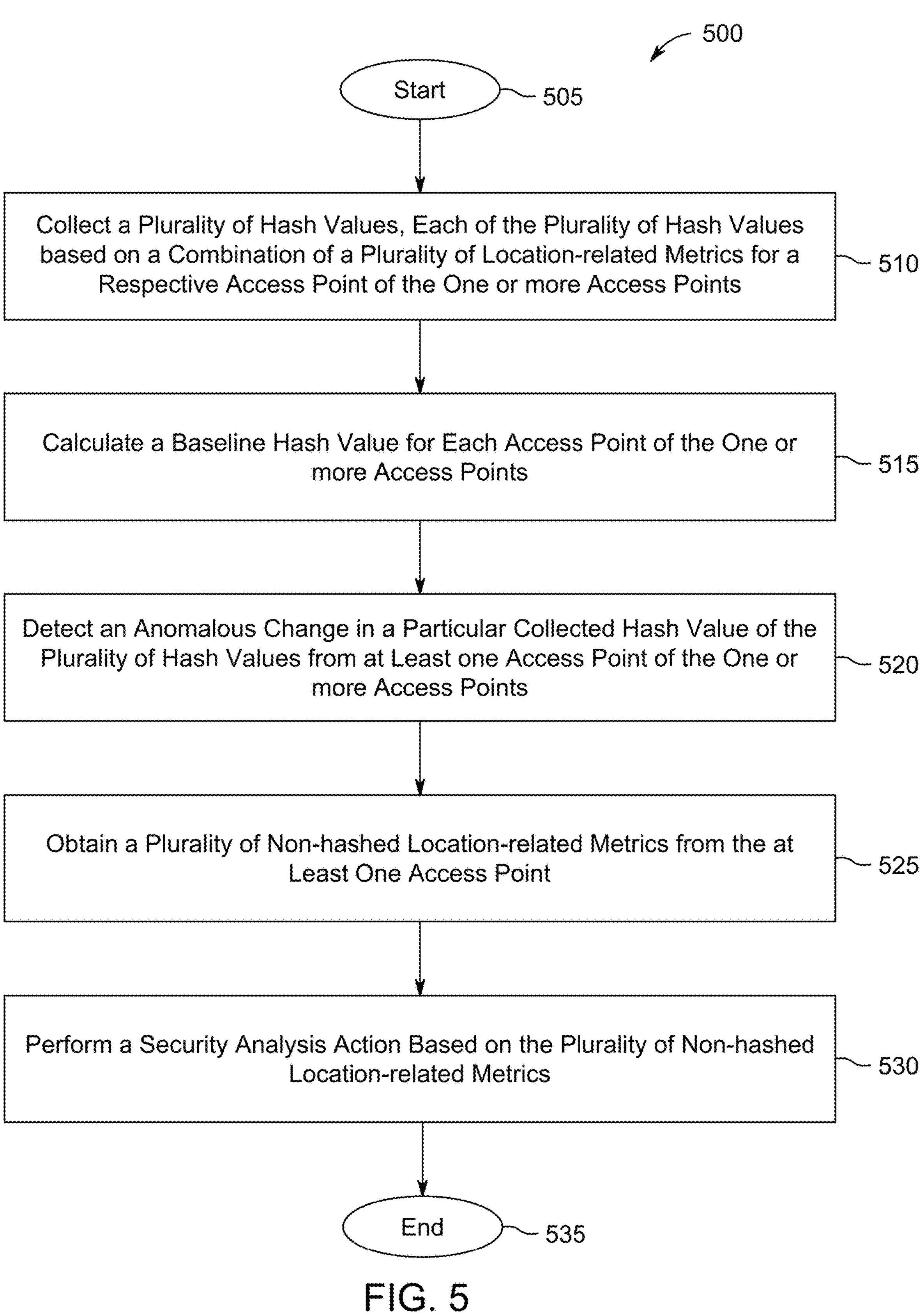
FIG. 5 illustrates an example procedure for advanced security through anomaly detection and locating in wireless networks.

In closing, FIG. 5 illustrates an example procedure for advanced security through anomaly detection and locating in wireless networks in accordance with one or more embodiments described herein. For example, a non-generic, specifically configured device (e.g., device 200, an apparatus) may perform procedure 500 by executing stored instructions (e.g., process 248). The procedure 500 may start at step 505, and continues to step 510, where, as described in greater detail above, a device collects, from each of one or more access points over time within a monitored location, a plurality of hash values, each of the plurality of hash values based on a combination of a plurality of location-related metrics for a respective access point of the one or more access points. In some implementations, the plurality of hash values can further be based on non-location data. In such implementations, the non-location data can be selected from a group consisting of: device identity information, and identification-based access patterns.

In some implementations, the plurality of hash values can be calculated using weighted inputs to weight an impact of a particular location-related metric on a change in the plurality of hash values. In such implementations, the device can adjust the weighted inputs used to calculate the plurality of hash values based on reinforcement learning. In addition to, or in the alternative, location-related metrics associated with the plurality of hash values are selected from a group consisting of: geolocation of the one or more access points, geolocation of client devices, roaming patterns, modulation and coding scheme values, and beamforming patterns. Further, in some implementations, the device can store the plurality of hash values in time-series for historical analysis.

Procedure 500 continues to step 515 where, as described in greater detail above, the device calculates a baseline hash value for each access point of the one or more access points, each baseline hash value correlated to actual location-related metrics from which each baseline hash value was computed.

Procedure 500 continues to step 520 where, as described in greater detail above, the device detects an anomalous change in a particular collected hash value of the plurality of hash values from at least one access point of the one or more access points. In some implementations, the baseline hash value for each access point can be updated to account for non-anomalous changes over time.

Procedure 500 continues to step 525 where, as described in greater detail above, the device obtains, in response to the anomalous change, a plurality of non-hashed location-related metrics from the at least one access point.

Procedure 500 continues to step 530 where, as described in greater detail above, the device performs a security analysis action based on the plurality of non-hashed location-related metrics. In some implementations, the security analysis action can be performed to determine what is causing the anomalous change, where the anomalous change is located, or both what is causing the anomalous change and where the anomalous change is located.

Implementations are not so limited, and in some implementations, the security analysis action can include collecting additional data from each of the one or more access points in addition to the combination of the plurality of location-related metrics that was used to compute each of the plurality of hash values. In addition to, or in the alternative, the security analysis action can include automatically quarantining one or more devices communicating within the monitored location.

In some implementations, the procedure 500 can include collecting, by the device and initially prior to collecting the plurality of hash values over time, the actual location-related metrics from which each baseline hash value was computed from each of the one or more access points and associating the actual location-related metrics to each baseline hash value, wherein the security analysis action based on the plurality of non-hashed location-related metrics from the at least one access point is in comparison to the actual location-related metrics from which each baseline hash value was computed as collected from each of the one or more access points.

In some implementations, the device can define the anomalous change as a threshold difference between a collected hash value and the baseline hash value. In such implementations, the device can adjust the threshold difference based on based on an accuracy of the anomalous change corresponding to an actual security issue within the monitored location.

The procedure 500 can further include setting, by the device, a degree of the security analysis action responsive to how anomalous the anomalous change is.

In some implementations, procedure 500 can further include analyzing changes in beamforming patterns to detect anomalies that could indicate tampering or interference, for example, by a nefarious actor or unauthorized device. In other implementations, procedure 500 can include developing algorithms to score deviations between current and historical hash outputs, with larger differences signaling higher anomaly probabilities. Procedure 500 can further include calculating, by the device, a baseline hash value for each access point of one or more access points, each baseline hash value correlated to actual location-related metrics from which each baseline hash value was computed. In addition to, or in the alternative, in some implementations, procedure 500 can include performing, by the device, a security analysis action based on the plurality of non-hashed location-related metrics.

Procedure 500 may end at step 535.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: collecting, from each of one or more access points over time within a monitored location, a plurality of hash values, each of the plurality of hash values based on a combination of a plurality of location-related metrics for a respective access point of the one or more access points; calculating a baseline hash value for each access point of the one or more access points, each baseline hash value correlated to actual location-related metrics from which each baseline hash value was computed; detecting an anomalous change in a particular collected hash value of the plurality of hash values from at least one access point of the one or more access points; obtaining, in response to the anomalous change, a plurality of non-hashed location-related metrics from the at least one access point; and performing a security analysis action based on the plurality of non-hashed location-related metrics.

In still other implementations, a system comprises a controller and a plurality of access points communicatively coupled to the controller. The controller is configured to: collect, from each of the plurality of access points over time within a monitored location, a plurality of hash values, each of the plurality of hash values based on a combination of a plurality of location-related metrics for a respective access point of the one or more access points; calculate a baseline hash value for each access point of the plurality of access points, each baseline hash value correlated to actual location-related metrics from which each baseline hash value was computed; detect an anomalous change in a particular collected hash value of the plurality of hash values from at least one access point of the plurality of access points; obtain, in response to the anomalous change, a plurality of non-hashed location-related metrics from the at least one access point; and perform a security analysis action based on the plurality of non-hashed location-related metrics.

The techniques described herein, therefore, provide for advanced security through anomaly detection and locating in wireless networks. The present disclosure allows not only for location-based anomaly detection, but furthermore allows for assisting in locating the anomaly using advanced geo-locating techniques from mixed metrics. Due to the increased size in such data, implementations herein utilize a hash-based anomaly indicator, which can trigger the pull of more specific metrics to allow for fine-tuned assessment and locating.

Illustratively, the techniques described herein may be performed by hardware, software, and/or firmware, (e.g., an "apparatus") such as in accordance with the anomaly locating process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

collecting, by a device and from each of one or more access points over time within a monitored location, a plurality of hash values, each of the plurality of hash values based on a combination of a plurality of location-related metrics for a respective access point of the one or more access points;

calculating, by the device, a baseline hash value for each access point of the one or more access points, each baseline hash value correlated to actual location-related metrics from which each baseline hash value was computed;

detecting, by the device, an anomalous change in a particular collected hash value of the plurality of hash values from at least one access point of the one or more access points;

obtaining, by the device and in response to the anomalous change, a plurality of non-hashed location-related metrics from the at least one access point; and performing, by the device, a security analysis action based on the plurality of non-hashed location-related metrics.

2. The method of claim 1, further comprising:

collecting, by the device and initially prior to collecting the plurality of hash values over time, the actual location-related metrics from which each baseline hash value was computed from each of the one or more access points; and associating the actual location-related metrics to each baseline hash value, wherein the security analysis action based on the plurality of non-hashed location-related metrics from the at least one access point is in comparison to the actual location-related metrics from which each baseline hash value was computed as collected from each of the one or more access points.

3. The method of claim 1, wherein the plurality of hash values are calculated using weighted inputs to weight an impact of a particular location-related metric on a change in the plurality of hash values.

4. The method of claim 3, further comprising:

adjusting, by the device, the weighted inputs used to calculate the plurality of hash values based on reinforcement learning.

5. The method of claim 1, further comprising:

updating the baseline hash value for each access point to account for non-anomalous changes over time.

6. The method of claim 1, wherein the security analysis action is performed to determine what is causing the anomalous change, where the anomalous change is located, or both what is causing the anomalous change and where the anomalous change is located.

7. The method of claim 1, wherein the security analysis action comprises:

collecting additional data from each of the one or more access points in addition to the combination of the plurality of location-related metrics that was used to compute each of the plurality of hash values.

8. The method of claim 1, wherein the security analysis action comprises:

automatically quarantining one or more devices communicating within the monitored location.

9. The method of claim 1, wherein location-related metrics associated with the plurality of hash values are selected from a group consisting of: geolocation of the one or more access points, geolocation of client devices, roaming patterns, modulation and coding scheme values, and beamforming patterns.

10. The method of claim 1, further comprising:

storing, by the device, the plurality of hash values in time-series for historical analysis.

11. The method of claim 1, wherein the plurality of hash values are further based on non-location data.

12. The method of claim 11, wherein the non-location data is selected from a group consisting of: device identity information, and identification-based access patterns.

13. The method of claim 1, further comprising:

defining, by the device, the anomalous change as a threshold difference between a collected hash value and the baseline hash value.

14. The method of claim 13, further comprising:

adjusting, by the device, the threshold difference based on based on an accuracy of the anomalous change corresponding to an actual security issue within the monitored location.

15. The method of claim 1, further comprising:

setting, by the device, a degree of the security analysis action responsive to how anomalous the anomalous change is.

16. The method of claim 1, further comprising:

determining, by the device, an expected change in the particular collected hash value of the plurality of hash values; and filtering out, by the device, false anomalies based on the expected change in the particular collected hash value of the plurality of hash values.

17. An apparatus, comprising:

one or more network interfaces to communicate with a network;

a processor coupled to the one or more network interfaces and configured to execute one or more processes; and a memory configured to store a process that is executable by the processor, the process comprising:

collecting, from each of one or more access points over time within a monitored location, a plurality of hash values, each of the plurality of hash values based on a combination of a plurality of location-related metrics for a respective access point of the one or more access points;

calculating a baseline hash value for each access point of the one or more access points, each baseline hash value correlated to actual location-related metrics from which each baseline hash value was computed;

detecting an anomalous change in a particular collected hash value of the plurality of hash values from at least one access point of the one or more access points;

obtaining, in response to the anomalous change, a plurality of non-hashed location-related metrics from the at least one access point; and performing a security analysis action based on the plurality of non-hashed location-related metrics.

18. The apparatus of claim 17, wherein the plurality of hash values are calculated using weighted inputs to weight an impact of a particular location-related metric on a change in the plurality of hash values.

19. The apparatus of claim 17, wherein the security analysis action comprises:

collecting additional data from each of the one or more access points in addition to the combination of the plurality of location-related metrics that was used to compute each of the plurality of hash values.

20. A system, comprising:

a controller; and a plurality of access points communicatively coupled to the controller, wherein the controller is configured to:

collect, from each of the plurality of access points over time within a monitored location, a plurality of hash values, each of the plurality of hash values based on a combination of a plurality of location-related metrics for a respective access point of the plurality of access points;

calculate a baseline hash value for each access point of the plurality of access points, each baseline hash value correlated to actual location-related metrics from which each baseline hash value was computed;

detect an anomalous change in a particular collected hash value of the plurality of hash values from at least one access point of the plurality of access points;

obtain, in response to the anomalous change, a plurality of non-hashed location-related metrics from the at least one access point; and perform a security analysis action based on the plurality of non-hashed location-related metrics.

* * * * *